(12) United States Patent
Bisbee et al.

(10) Patent No.: US 7,657,531 B2
(45) Date of Patent: Feb. 2, 2010

(54) SYSTEMS AND METHODS FOR STATE-LESS AUTHENTICATION

(76) Inventors: Stephen F. Bisbee, 7206 Bellona Ave., Baltimore, MD (US) 21212; Jack J. Moskowitz, 4623 Autumn Woods Way, Ellicott City, MD (US) 21043; Keith F. Becker, 1212 Swanhill Ct., Baltimore, MD (US) 21226; Ellis K. Peterson, 288 Waycross Way, Arnold, MD (US) 21012; Gordon W. Twaddell, 310 Linden Shade Ct., Millersville, MD (US) 21108

( * ) Notice: Subject to any disclaimer, the term of this patent is extended or adjusted under 35 U.S.C. 154(b) by 217 days.

(21) Appl. No.: 11/325,463

(22) Filed: Jan. 5, 2006

(65) Prior Publication Data
US 2006/0117015 A1 Jun. 1, 2006

Related U.S. Application Data

(63) Continuation of application No. 09/839,551, filed on Apr. 19, 2001, now Pat. No. 7,020,645.

(51) Int. Cl.
*G06F 7/00* (2006.01)
*G06F 17/30* (2006.01)
(52) U.S. Cl. .................. 707/9; 709/224; 726/4
(58) Field of Classification Search .............. 707/1–10, 707/100–104.1, 200–206; 709/229, 223–225; 715/743; 726/2–4
See application file for complete search history.

(56) References Cited

U.S. PATENT DOCUMENTS

| | | | |
|---|---|---|---|
| 5,241,594 A | 8/1993 | Kung | |
| 5,311,596 A | 5/1994 | Scott et al. | |
| 5,475,758 A | 12/1995 | Kikuchi | |
| 5,481,700 A | 1/1996 | Thuraisingham | |
| 5,590,199 A | 12/1996 | Krajewski, Jr. et al. | |
| 5,615,268 A | 3/1997 | Bisbee et al. | |
| 5,655,077 A | 8/1997 | Jones et al. | |
| 5,684,950 A | 11/1997 | Dare et al. | |
| 5,689,638 A | 11/1997 | Sadovsky | |
| 5,719,941 A | 2/1998 | Swift et al. | |
| 5,748,738 A | 5/1998 | Bisbee et al. | |
| 5,757,920 A | 5/1998 | Misra et al. | |
| 5,768,504 A | 6/1998 | Kells et al. | |
| 5,774,650 A | 6/1998 | Chapman et al. | |

(Continued)

OTHER PUBLICATIONS

Suan-Suan Chew et al., IAuth: An authentication system for Internet applications, Aug. 13-15, 1997, IEEE, 654-659.*

(Continued)

*Primary Examiner*—Jean B Fleurantin
(74) *Attorney, Agent, or Firm*—Fitch Even Tabin & Flannery

(57) ABSTRACT

Systems and methods for providing user logon and state-less authentication are described in a distributed processing environment. Upon an attempted access by a user to an online resource, transaction, or record, a logon component asks the user to supply a logon ID and a password. The logon component verifies the provided information, and upon successful identification, a security context is constructed from information relevant to the user. The security context is sent to the user and is presented to the system each time the user attempts to invoke a new resource, such as a program object, transaction, record, or certified printer avoiding the need for repeated logon processing.

13 Claims, 7 Drawing Sheets

U.S. PATENT DOCUMENTS

| | | |
|---|---|---|
| 5,802,518 A | 9/1998 | Karaev et al. |
| 5,864,871 A | 1/1999 | Kitain et al. |
| 5,884,312 A | 3/1999 | Dunstan et al. |
| 5,937,068 A | 8/1999 | Audebert et al. |
| 5,944,824 A | 8/1999 | He |
| 5,999,711 A | 12/1999 | Misra et al. |
| 6,148,404 A | 11/2000 | Yatsukawa |
| 6,178,511 B1 | 1/2001 | Cohen et al. |
| 6,192,361 B1 | 2/2001 | Huang |
| 6,237,096 B1 | 5/2001 | Bisbee et al. |
| 6,275,944 B1 | 8/2001 | Kao et al. |
| 6,314,425 B1 | 11/2001 | Serbinis et al. |
| 6,327,659 B2 | 12/2001 | Boroditsky et al. |
| 6,332,192 B1 | 12/2001 | Boroditsky et al. |
| 6,338,064 B1 | 1/2002 | Ault et al. |
| 6,367,013 B1 | 4/2002 | Bisbee et al. |
| 6,377,994 B1 | 4/2002 | Ault et al. |
| 6,401,211 B1 | 6/2002 | Brezak, Jr. et al. |
| 6,421,768 B1 | 7/2002 | Purpura |
| 6,427,209 B1 | 7/2002 | Brezak, Jr. et al. |
| 6,484,174 B1 | 11/2002 | Wall et al. |
| 6,581,060 B1 | 6/2003 | Choy |
| 6,879,995 B1 * | 4/2005 | Chinta et al. ................ 709/204 |

OTHER PUBLICATIONS

Fox et al., "Cooperative security": a model for the new enterprise, Jun. 17-19, 1998, IEEE, 314-319.*

Bellovin, Steven M. "Probable Plaintext Cryptanalysis of the IP Security Protocols", *IEEE* (1997), pp. 52-59.

Herda, S. "Non-repudiation: Constituting evidence and proof in Digital Cooperation", *Computer Standards and Interfaces*, vol. 17, No. 1 (Jan. 1995), pp. 69-70.

Kormann, David P., et al. "Risks of the Passport Single Signon Protocol", *IEEE Computer Networks*, vol. 33 (2000), pp. 51-58.

Lawry, J. "Location-independent Information Object Security", *Proceedings of the Symposium on Network and Distributed System Security*, San Diego, CA (Feb. 17, 1995), pp. 54-62.

Netegrity, Inc. [online] [retrieved on Apr. 11, 2001] Retrieved from the Internet: <http://www.netegrity.com> All Pages.

* cited by examiner

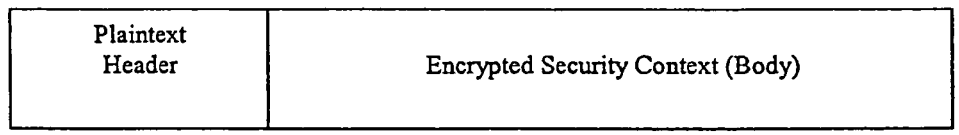
Fig. 4a
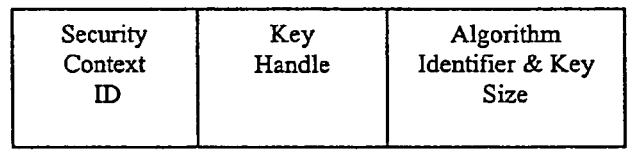
Fig. 4b
| User IDs | Org. ID | Role, Credentials & Other Authorization Information | Bypass Flag(s) | Time-Offset or Delta-Time | Period-of-Use or Expiration Time | User Public Key Algorithm & Public Key &/or Certificate | Symmetric-Session Algorithm, key size & Key | Hash or Integrity Check |
|---|---|---|---|---|---|---|---|---|
| | | | | | | | | |
Fig. 4c

| Security Context | User Request or Submission (Payload) |

Fig. 6a

| Security Context ID | Client Time | Request Counter | Action or Access Request(s) |

Fig. 6b

| Request Counter | Return Payload |

Fig. 7

SYSTEMS AND METHODS FOR STATE-LESS AUTHENTICATION

This invention is a continuation of prior U.S. patent application. Ser. No. 09/839,551, filed Apr. 19, 2001 now U.S. Pat. 7,020,645. This invention relates to authentication of users of electronic information and transaction processing systems, and more specifically to systems and methods for authenticating users of programs objects in distributed computing environments based on negotiated security contexts.

BACKGROUND

Many computer and communication systems restrict access to authorized users. As typically shown in FIG. 1, a user 110 accesses such a system 120 through a suitable interface such as a computer 130 executing a client application. The computer 130 and client application can communicate with the system 120 by either a direct connection or via the Internet using a convenient protocol such as http as illustrated by connection 140. In accessing the system 120, the client application recognizes that a user authentication process must be carried out as a threshold step, and thus the client application usually requests the user 110 to enter a logon ID and a password that uniquely identify the user 110 to the system 120. The logon ID and password are conventionally forwarded to a logon component 122 via an application server component 124 included in the system 120.

The logon component 122 compares the logon ID and password received from the user to an archive of logon IDs and passwords stored in a rules database 126. Upon finding a match with the forwarded logon ID, the logon component 122 retrieves the corresponding password from the rules database 126 and compares the retrieved password with the password forwarded by the user 110. If the passwords match, the logon component 122 sends an instruction or a message via the application server component 124 to the client application in computer 130 that indicates that the user 110 was properly identified and authenticated to proceed. This authentication step and/or subsequent instructions or messages may initiate a secure communication session using a convenient protocol such as https indicated by connection 150. Subsequent communication between the system 120 and computer 130 can then proceed in private.

Where encryption is employed, a client cryptographic token such as an electronic circuit card conforming to the standards of the PC Memory Card Interface Association (a PCMCIA card or PC Card) can be used in the computer 130. In general, a token is a portable transfer device that is used for transporting keys, or parts of keys. It will be understood that PC Cards are just one form of delivery mechanism; other kinds of tokens may also be used, such as those conforming to RSA Laboratories' software token Public-Key Cryptography Standard (PKCS) #12, floppy diskettes, and Smart Cards.

If the logon ID provided by the user 110 does not match an ID in the rules database 126 or if the password comparison fails, the logon component 122 typically sends a message or instruction through the application server component 124 to the client application to inform the user 110 that the submitted logon information was incorrect and to prompt the user to re-enter it. This process of entering and attempting to verify the logon information may be permitted to occur a few times, but in the event of repeated failure, the logon component 122 may finally reject further logon attempts by the user 110, direct the client application to inform the user 110 that the logon process has failed, terminate the communication session, and lock out the user from any further logon attempts.

A password is one form of identification that may be presented to the logon component 122 that authenticates the user's access rights, which may range from simply viewing selected records in the system 120 to performing all transactions permitted by the system 120. This kind of secured transaction processing is typically "state-full" in that it maintains, in the transaction session, the process state and content of the user's logon access information. Different transactions are typically implemented in modern distributed, nested, transaction processing systems by different program objects, e.g., applications or subroutines, that are substantially independent, even to the extent of executing on different processor hardware. For a user to migrate from one secured transaction to another, which is often necessary for even simple uses of today's systems, the user is generally required to logon (i.e., be authenticated) to each transaction, often with ID's and passwords unique to each transaction. This is because state-full systems impose state routing restrictions on users, and only sessions with particular restrictions can service a given user without having to close one program object and open another, with the corresponding requisite logon.

Besides the burden on system resources imposed by each logon, which requires access to and processing by a logon component and a rules database, state-full systems often compel each user to close one secured transaction (program object or application) before entering another, limiting the flexibility of the system from the user's perspective. In addition, if the path to the rules database is closed or if excessive traffic slows processing or access to any of the necessary components of the system, the user access to the desired application is compromised, even if the user's access is fully authorized. This becomes a significant problem for systems having many potential users because economics often limits the system resources that can be made available.

Another problem is that conventional enrollment systems can be viewed as "open doorways" into an otherwise protected application in that a successful logon provides a user full access to the application and a failed logon "slams the door" on access to the application. No middle ground is generally provided, whereby a properly identified user is provided partial access to an application or transaction.

Yet another problem with systems like that depicted in FIG. 1 is the vulnerability of such systems to a hacker's or a pirate's intercepting a user's logon information at any of several points and then gaining unauthorized access to a supposedly secure system, such as an online brokerage system. One countermeasure to such interception is the application of cryptography to the data being transmitted. Public-Key Cryptography (PKC), or asymmetric cryptography, is a form of data encryption that uses a pair of cryptographic keys, each pair having a public key that is used for encryption and a private (secret) key used for decryption. Exemplary PKC algorithms, which comply with contemporary government or commercial standards, are the Digital Signature Algorithm and the Rivest-Shamir-Adleman (RSA) algorithm. The alternative to PKC is a symmetric key cryptographic system that uses the same key for encryption and decryption. Exemplary symmetric systems are the Data Encryption Standard (DES) and its improvement, the Advanced Encryption Standard (AES), recently announced by the National Institute of Standards and Technology (NIST). Symmetric key cryptography is normally employed for encrypting large amounts of data since it is much faster than PKC, but PKC is still advantageously used for key distribution. Nevertheless, encrypting transmitted data may address privacy concerns in electronic commerce and communication, but encryption alone does not address the issues of integrity and authentication of the transmitted information.

In this application, "privacy" means the protection of a record from unauthorized access. "Integrity" means the ability to detect any alteration of the contents of a record or of the relative authority of a user to perform a transaction or access a record. "Authentication" means verification of the authority of a user to perform a transaction, use a system resource, or access an electronic record. It will be appreciated that "electronic record" and "record" mean information in any electronic form, regardless of type of medium or type of information. Thus, a record can be a tape cartridge, a voice transmission or recording, a video image, a multi-media object, a contract, metadata, a database of information, etc.

Integrity and authentication of information are typically handled by other cryptographic operations, in particular hashing the information to be protected and appending one or more digital signatures. In general, a one-way cryptographic function operates on the information and produces a "hash" or "message digest" in a way such that any change of the information produces a changed message digest. Since a different message digest is produced if even one bit of the information object is changed, the hash operation yields a strong integrity check. Known hashing algorithms are the Secure Hash Algorithm (SHA-1) and the Message Digest 5 (MD-5) algorithm, and new algorithms appear from time to time. Information is typically digitally signed by hashing the information, encrypting the resulting hash using the signer's private key, and appending the encrypted hash to the information. Thus, digital signatures are generated in a manner like PKC, but the keys are reversed: the encryption key is private and the decryption key is public; the digital signer signs information with the private key and a user can read the digital signature with the signer's public key. Since a digital signature is a non-forgeable data element attached or allocated to information that ties the signer to the information, the digital signature yields an authentication check. It will be appreciated that a digital signature differs from a holographic, or handwritten, signature and from a digitized holographic signature, which is a handwritten signature that has been captured electronically.

The uses of digital signatures typically involve uses of authentication certificates, which are non-forgeable, digitally signed data elements that bind the signers' identity information to the signers' public-key information. Authentication certificates have been standardized by the International Telecommunications Union (ITU) under International Standard X.509, as documented in "The Directory-Authentication Framework" (1988) and as interpreted by the Internet Engineering Task Force Public Key Infrastructure X.509 recommendations. An authentication certificate is digitally signed and issued by a Certification Authority that is responsible for ensuring the unique identification of all users. Each authentication certificate typically includes the following critical information needed in the signing and verification processes: a certificate version number, a serial number, identification of the Certification Authority that issued the certificate, identifications of the issuer's hash and digital signature algorithms, a validity period, a unique identification of the user who owns the certificate, and the user's public cryptographic signature verification key. A signer's authentication certificate may be appended to information to be protected with the user's digital signature so that it is possible for others to verify the digital signature.

Single-logon methods have been implemented in which a logon component returns a "cookie" or token to a client application that allows the client application system-wide logon in a distributed computing environment. One example of this is the SITEMINDER software product made by Netegrity, Inc., Waltham, Mass., and described at www.netegrity.com. Such single-logon methods avoid the need for repeated logons, but have severe limitations when used with state-less computing environment components.

U.S. Pat. No. 5,757,920 for "Logon Certification" and No. 5,999,711 for "Method and System for Providing Certificates Holding Authentication and Authorization Information for Users/Machines", both to Misra et al., describe logon certificates that are provided to support disconnected operation in distributed computing systems. Each logon certificate is a secure package holding credentials information sufficient to establish the identity and rights and privileges for a user or a machine in a domain that is not the user's/machine's home domain.

U.S. Pat. No. 5,241,594 to Kung for "One-Time Logon Means and Methods for Distributed Computing Systems" describes storing password files in all networked computers in a distributed system and, after a user logs on to a computer, forwarding authentication information to a second computer using a secure transport layer protocol if the user wishes to use services at the second computer. The second computer compares the user's authentication information it receives with the user's authentication information it stores, and if the information matches, the user is logged on to the second computer.

Other logon methods and systems are described in U.S. Pat. No. 5,655,077 to Jones et al. for "Method and System for Authenticating Access to Heterogeneous Computing Services"; U.S. Pat. No. 5,689,638 to Sadovsky for "Method for Providing Access to Independent Network Resources by Establishing Connection Using an Application Programming Interface Function Call Without Prompting the User for Authentication Data"; U.S. Pat. No. 5,768,504 to Kells et al. for "Method and Apparatus for a System Wide Logan [sic] in a Distributed Computing Environment"; U.S. Pat. No. 5,774,650 to Chapman et al. for "Control of Access to a Networked System"; U.S. Pat. No. 5,884,312 to Dustan et al. for "System and Method for Securely Accessing Information from Disparate Data Sources through a Network"; and U.S. Pat. No. 6,178,511 to Cohen et al. for "Coordinating User Target Logons in a Single Sign-On (SSO) Environment".

The problems with systems like that shown in FIG. 1 are keenly felt in many computer and communication systems, including as just one example those employed in electronic commerce. As paper documents that have traditionally recorded transactions, such as the purchase of an object, the withdrawal of bank funds, or the execution of a contract, are replaced by electronic records, serious issues of physical control of the electronic records and access to them are raised. Systems and methods for providing a verifiable chain of evidence and security for the transfer and retrieval of electronic records and other information objects in digital formats have been described in U.S. Pat. Nos. 5,615,268; 5,748,738; and 6,237,096; all to Bisbee et al., and U.S. patent. applications. Ser. No. 09/452,928, filed on Dec. 2, 1999, and U.S. patent application Ser. No. 09/737,325, filed on Dec. 14, 2000, both by Bisbee et al. These patents and applications are expressly incorporated here by reference, and describe among other things flexible business rules that enable users to have roles that are required or enabled only at particular points in a transaction or process. For example, a user may have a role of title agent only after a transaction has closed.

Such work flows and processes can be more complex than those typically associated with single-logon techniques.

Moreover, many electronic records available to online inquiry are neither encrypted, nor hashed, nor digitally signed since to do so increases the processing time and resources needed for authorized users to access such information.

SUMMARY

This invention solves the above-described and other problems suffered by computer and communication systems having restricted access, providing methods and systems for providing secure access to information in an on-line, networked environment in which traditional methods of verification, integrity, and authentication are generally inapplicable or ineffective. Important features of the invention involve an encrypted data element called a security context, which is securely built and accessible only by a trusted computing environment, thereby eliminating the risk of interception, modification, or unauthorized use.

In one aspect of the invention, a security context is built from a user's logon information and from system authorization information that define the user's access rights to protected on-line applications and electronic information. The security context is hashed and encrypted to protect the included logon and access information from theft and misuse. Following a successful logon that establishes a respective security context, the user may seek access to applications, transactions, and records without having to re-logon and without having to re-access a logon rules database. This does not preclude the user from requesting a new security context if necessitated by a change in either the user's role in a transaction or the type of transaction. A user's level of access can be controlled by a plurality of identifiers, such as the user's logon ID, the user's organization ID and sub-organization ID's, and the user's particular role or credentials within the organization. System resources protected in accordance with this invention are not limited to electronic records and computer-directed applications and transactions but also extend to secured equipment, such as facsimile machines and certified printers.

In another aspect of the invention, a method of enabling access to a resource of a processing system includes the steps of establishing a secure communication session between a user desiring access and a logon component of the processing system; verifying that logon information, provided by the user to the logon component during the secure communication session, matches stored information identifying the user to the processing system; generating a security context from the logon information and authorization information that is necessary for access to the resource; providing the security context to the user; and sending, by the user to the processing system, the security context and a request for access to the resource. The resource may be at least one of a processor, a program object, and a record of the processing system, and the logon component may provide a symmetric encryption key to the user in establishing the secure communication session. The user may digitally sign the request for access, the user's digital signature may be included with the request for access in a wrapper that is sent with the security context to the processing system, the user's digital signature may be checked by the processing system, and access to the resource may be granted only if the user's digital signature is authenticated.

The logon information may include a password and at least one of a user identifier, an organization identifier, a sub-organization identifier, a user location, a user role, and a user position. The logon information may be verified by checking for agreement between the stored information identifying the user to the processing system and the password and at least one of a user identifier, an organization identifier, a sub-organization identifier, a user location, a user role, and a user position provided by the user to the logon component.

The security context may include a plaintext header and an encrypted body, and the plaintext header may include a security context ID, a key handle, and an algorithm identifier and key size. The encrypted body may include at least one of a user identifier, an organization identifier, access information, an expiration time, public key information, symmetric key information, and a hash, and access to the resource may be denied if the expiration time differs from a selected time. The access information may specify at least one resource accessible by the user; the expiration time specifies a time after which the security context is invalid; and the hash is computed over the plaintext header and the encrypted body before encryption, and may be digitally signed by the logon component.

The method may further include the step of determining, by a stateless component of the processing system, based on the security context sent with the request for access by the user, whether access to the requested resource should be granted to the user. The request for access may be at least partially encrypted with a symmetric encryption key extracted from the security context. A hash value may be computed over the request for access and be included with the security context and the request for access sent by the user to the processing system, with the integrity of the request for access being checked based on the hash value, and access being granted only if the integrity of the hash value is verified. A request counter may be included in the request for access, and if access is granted, a response is sent to the user that includes a request counter, enabling the user to match the response to the request for access. A response can also be an acknowledgement of an action performed (e.g., creation of a "certified" printout of a record).

In another aspect of the invention, a processing system having resources, such as processors, program objects, and records, that are selectively accessible to users includes a communication device through which a user desiring access to a resource communicates sends and receives information in a secure communication session with the processing system; an information database that stores information identifying users to the processing system and authorization information that identifies resources accessible to users and that is necessary for access to resources; and a logon component that communicates with the communication device and with the information database, wherein the logon component receives logon information provided by the user during the secure communication session, verifies the received logon information by matching against information identifying the user to the processing system that is retrieved from the information database, and generates a security context from the received logon information and authorization information. The logon component provides the security context to the user's communication device, and the user sends, to the processing system, the security context and a request for access to a resource. The processing system may further include a cryptographic accelerator, and the logon component may receive a symmetric encryption key from the cryptographic accelerator and provides the symmetric encryption key to the user's communication device.

Other aspects of the invention are described below.

BRIEF DESCRIPTION OF THE DRAWINGS

These and other objects and advantages of this invention will become more apparent from the following description, read in conjunction with the drawings, of which:

FIG. 4a is a diagram of a security context in accordance with this invention;

FIG. 4b is a diagram of a plaintext header of a security context;

FIG. 4c is a diagram of a body of a security context;

FIG. 6a is a diagram of a security context associated with a user request or submission;

FIG. 6b is a diagram of a security context associated with a user request in which a time parameter and a request counter are additional authentication factors;

FIG. 7 is a diagram of the system response to a user request or submission; and

DETAILED DESCRIPTION

It will be appreciated that Applicants' invention can be implemented utilizing commercially available computer systems and technology, and since the details of such are well known to those of skill in the art, they will not be described in this application.

Figure 1:
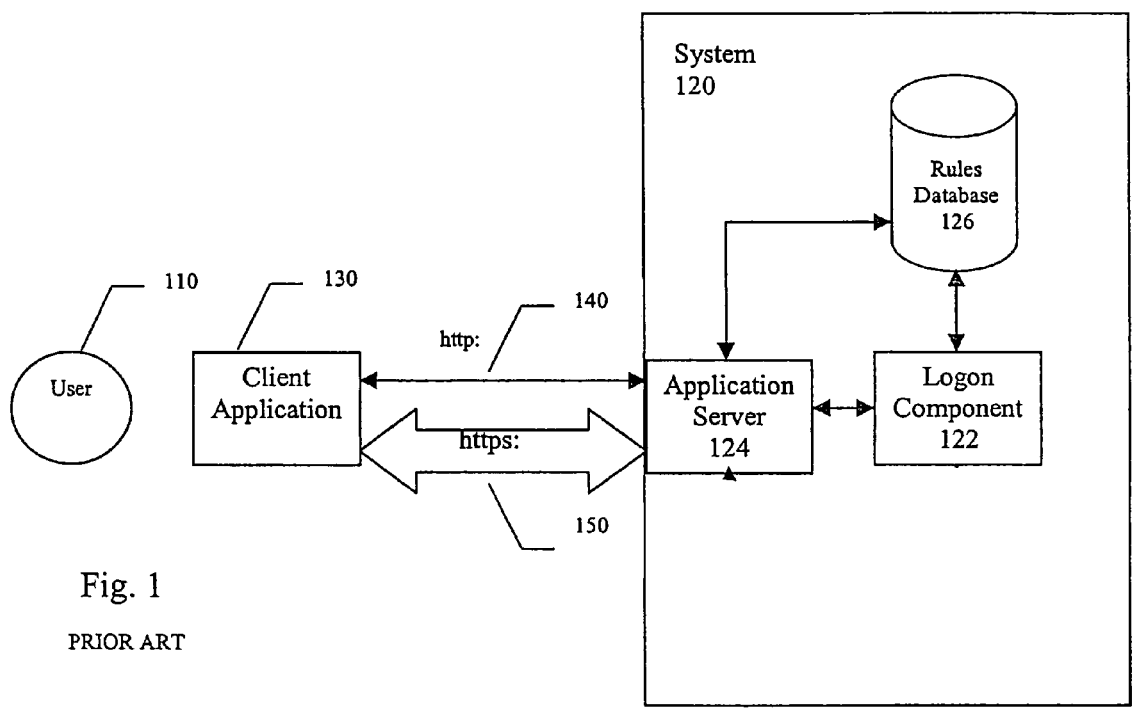
FIG. 1 is a block diagram of user authentication in existing processing systems.
Figure 2:
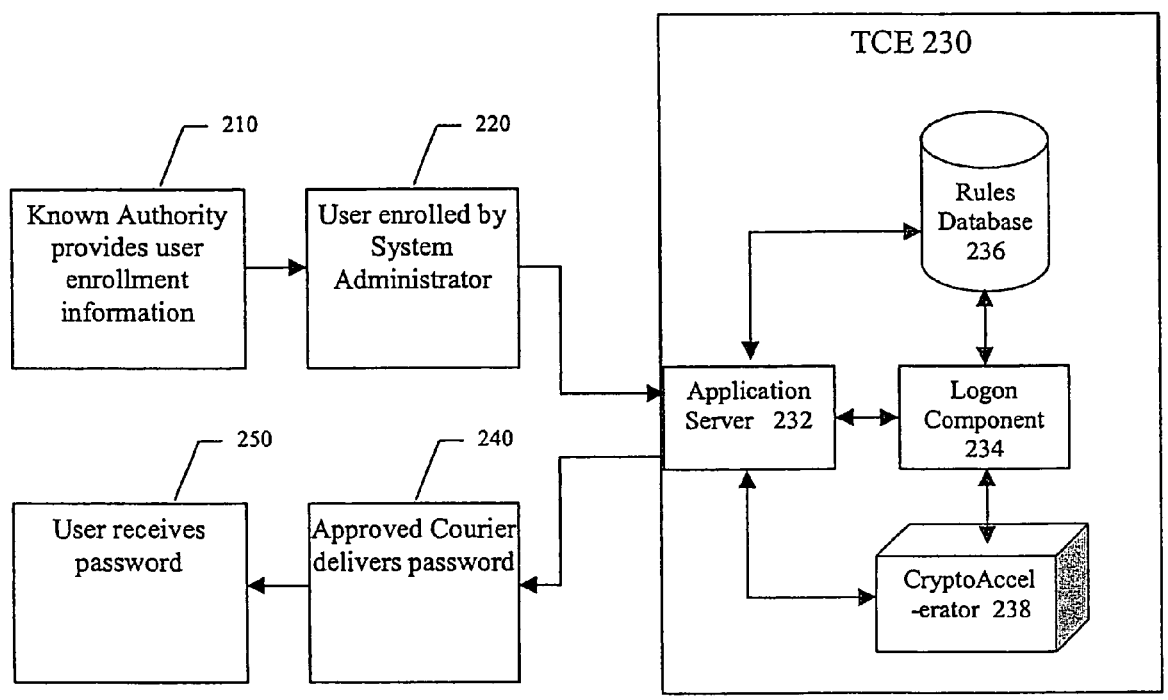
FIG. 2 is a block diagram of user enrollment in a system in accordance with this invention.

In using secure transaction processing systems, even in a system such as that depicted in FIG. 1, a system administrator usually must enroll a user with the system by entering identification, authorization, and attribute information that uniquely describe the user to the system. This is depicted in FIG. 2, which shows a user's enrollment information being provided by a known authority 210 to a system administrator 220, which enters the enrollment information into a trusted computing environment (TCE) 230. Entered information may include such items as the user's name, user identification (ID), organization name, organization ID, and location.

The enrollment information is typically provided to an interface device such as an application server component 232 that communicates with a logon component 234 of the TCE 230. The logon component 234 or an equivalent device generates a password for the user and securely stores the password in a protected rules database 236. Since password generation and protection is often processing intensive, the TCE 230 may include a suitable cryptographic accelerator 238 or other special-purpose processor that implements the cryptographic algorithms used for generating and checking passwords and for other operations. The password is securely delivered to the user via the application server 232 and an approved courier 240. The approved courier 240 may be a traditional overnight service, such as Federal Express, that delivers the password in physical form, or an e-mail server or a facsimile machine that delivers the password electronically. The user receives the password (block 250) and must present the password to the TCE system 230 before access is granted.

The TCE is so named because it includes the elements necessary for authenticated access to the transactions offered through the application server 232.

Many of the components for enrolling a user as depicted in FIG. 2 have additional important functions. In particular, enrollment information solicited by the system administrator and provided by a known authority to uniquely identify the user to the TCE 230 is extensive. For example, the enrollment information preferably includes organization name, organization ID, role, and optionally, location and multiple sub-organization names and IDs. The known authority may typically be associated with a sponsoring organization or other entity that endorses the user's access to secured system resources and is known to the system 230. While the known authority or sponsoring organization generally provides the user's enrollment information to the system 230, the user may also provide the information.

The logon component 234 examines all received enrollment information for compliance with rules and requirements maintained in the rules database 236, which must be protected storage to ensure the integrity of the identification and authorization information it maintains. Any received enrollment information that is not in compliance preferably causes a message to be displayed or other indication to be given to the information submitter to prompt submission of correct information. In general, the rules database 236 may be initialized with user authorization and attribute information in the form of data, flags, algorithms, business rules, etc. With this information, as will be discussed more thoroughly below, the system can provide varying levels of authorized access to system resources, depending on the particular organization or sub-organization the user represents and the role the user plays in accessing particular transactions and/or records.

As with conventional systems, the enrollment information obtained by the system administrator is passed to the logon component 234, which instead of merely storing a password in the rules database 236, first processes the password through a suitable protective method or device such as a hashing algorithm and stores the hashed password in the rules database such that it is associated, or linked, to the particular user by the user's logon ID and optionally by the user's organization ID. The logon component 234 then forwards the unhashed (plaintext) password to the user through any of the secure communication channels discussed above. After a user has been enrolled by the system 230 and has received a password, the user can access system applications, components, transactions, and records, but only after the user is authenticated as having authority to access the secured resources.

Figure 3:
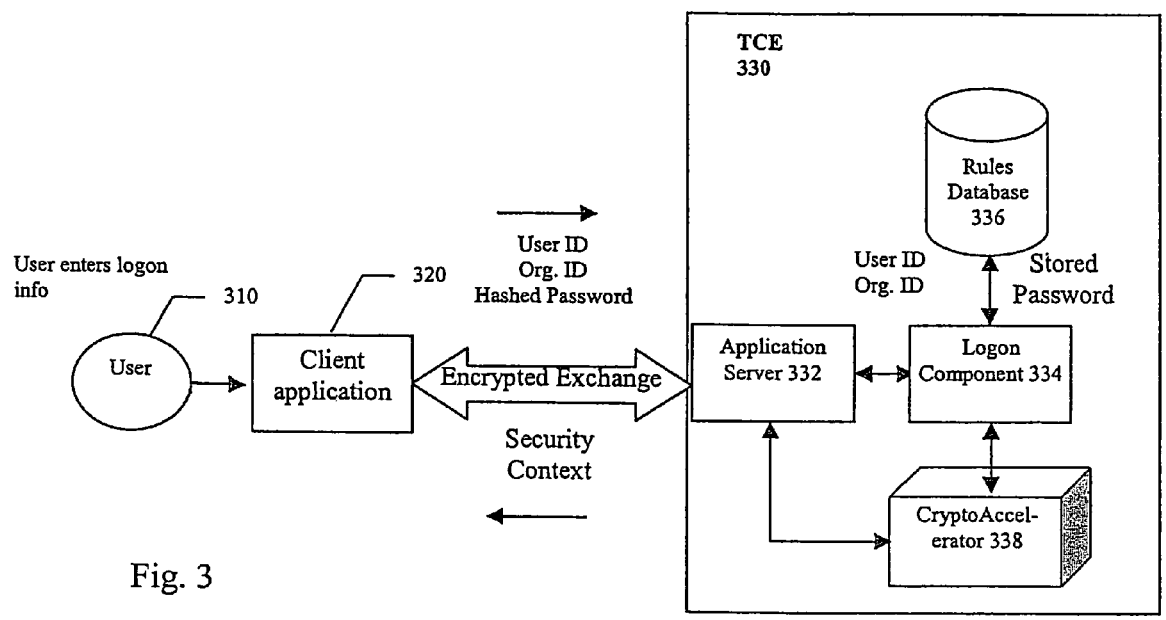
FIG. 3 is a block diagram of user authentication in a system in accordance with this invention.

FIG. 3 is a block diagram depicting user authentication in accordance with an aspect of this invention. After a User 310 invokes a protected Client Application 320, whether via a direct connection to a TCE 330 or via an Internet browser, control passes automatically from the user-invoked application via an Application Server 332 to a Logon Component 334 to attempt authentication of the User 310 through the exchange of secured logon information. As indicated in FIG. 3, the Client Application 320 may execute in a suitable computer or terminal having a Cryptographic Token as described above in connection with FIG. 1. One function of the Logon Component 334 is generating a private/public encryption key pair at pre-selected time intervals for use in creating secret symmetric sessions between the User 310 and the Logon Component 334. Rather than being generated by the Logon Component 334 alone, the key pairs may advantageously be generated in cooperation with an otherwise conventional Cryptographic Accelerator 338, in which case "handles"

associated with the private key and public key of a key pair are provided to the Logon Component 334 for convenience of processing.

In these secret symmetric sessions, encrypted logon information is exchanged and passwords are validated as more thoroughly discussed below. Encryption helps to secure the integrity of the information exchanged between the User 310 and the Logon Component 334 during the logon process and to minimize the possibility that any of the logon information can be intercepted and used for unauthorized access to system resources. By generating and utilizing the encryption keys internally, the system 330 precludes external, unauthorized access to the keys.

The encryption key pair that has been most recently generated can be called the "current" key pair and is preferably allocated to all logon processing until the next key pair is generated. Key pairs advantageously are usable for respective limited periods of time, so that an earlier encryption key pair persists until it expires.

As an alternative to private/public encryption key pairs, the Logon Component 334 can use a known key exchange algorithm/protocol to generate a secret symmetric session encryption key. Exemplary algorithms for creating secret symmetric keys are the Diffie-Hellman algorithm and the Key Exchange algorithm of the NIST. Even so, it is currently preferred to use application server-side authentication employing an X.509 authentication certificate that enables establishment of a secure socket layer (SSL) session. As yet another alternative, user and server authentication certificates can be used to establish a two-way authenticated SSL session. The advantage of either SSL approach is its facilitation of the use of the Cryptographic Token and the Cryptographic Accelerator 338 that relieves both the user and the Application Server 332 processors from the burden of carrying out the cryptographic operations.

After a secret symmetric key is determined by the Logon Component 334, it is routed to the User 310 to establish a secure session, in which encrypted information can be exchanged by the User 310 and the Logon Component 334. The Logon Component 334 then requests logon information from the User 310. In response, the User 310 transmits its identity information and the local time ("Client Time") to the Logon Component 334.

The user's identity information preferably includes its logon ID, organization ID, password or shared secret (e.g., a personal identification number (PIN), a passphrase, biometric information (fingerprint, retina scan, voiceprint, etc.)), etc. The user's logon ID advantageously becomes the relative basis for accessing user-related authorization information in the Rules Database 336. The organization ID can include a hierarchy of IDs, each representing a sub-organization within the organization, such as a subsidiary or a department, to which the user may be associated. Additionally, the identity information can include user functional data, such as the user's role, position, or credentials in the organization. The password provided by the User 310 is typically hashed at the user's side of the exchange prior to transmission to the Logon Component 334 to provide an additional level of protection against unauthorized capture of the password during transmission. Further protection against unauthorized access to the user's password may be obtained by encrypting the password, e.g., according to RSA Laboratory's PKC Standards (PKCS) #5—Password-Based Cryptography Standard, using the secret symmetric key received from the Logon Component 334. The Client Time may also be provided during logon as an anti-spoof feature which will be described later in this description.

The Logon Component 334 decrypts the user-entered logon information if necessary, using the Application Server-side symmetric key and the Cryptographic Accelerator 338, and compares the logon information to the authorization information in the Rules Database 336, as linked by the entered user logon ID. The hash of the password entered by the User 310 is compared to the hashed password stored in the secured storage of the Rules Database 336, also as linked by, or related to, the entered user logon ID to determine that the two hashes match. If any of the identification and authentication information submitted by the User 310 is in error or fails to match the data or rules in the Rules Database 336, the User 310 is challenged by the Logon Component 334 to check and resubmit the User's information. After a predetermined number of failures, the logon session, and thus the User's access attempt, will be terminated. Such a limit helps prevent a brute force password attack. The User 310 may attempt to logon again, but several more sequential repeats of the logon failure, as determined by system security attributes in the Rules Database 336, will lock out the User 310 and will alert a system security officer. Alternatively, the Logon Component 334 may disable the User's logon ID in the Rules Database 336 until a system security officer can review the logon failures.

After the User's identification and password information have been presented and verified, the Logon Component 334 retrieves the User's authorization information from the Rules Database 336, as linked by the user's logon ID and conditioned on the user's organization ID(s) and role(s). Authorization information may be built at this point based on the user's organization ID(s) and role(s) as determined by any corresponding business rules in the Rules Database. The Logon Component 334 then creates a Security Context that conveys the user's identity and other relevant authorization information necessary to gain access to Application Server-based system resources, including online transactions and electronic records. This identity and authentication information is sufficient to qualify the User for the full range of activities needed to carry out those actions and accesses previously authorized for the User.

Referring now to FIGS. 4a, 4b, and 4c, and initially to FIG. 4a, a Security Context is built that comprises a Plaintext Header and a Security Context Body. The Plaintext Header, shown in more detail in FIG. 4b, comprises a Security Context ID, a Key Handle that permits retrieval of the selected secret symmetric key, and an Algorithm Identifier, including the Key Size of the selected symmetric key. The Security Context Body, shown in more detail in FIG. 4c, comprises at least some of user and organization identities; role and access information; Bypass Flag(s); a Time-Offset information element (the difference between the User's Current Time and the TCE's current time); an Expiration Time information element (the time later than which the Security Context is invalid); the User's Public Key Algorithm identifier, Key Size, and Public Key; the Symmetric-Session/Request Key Algorithm identifier, Key Size, and generated Symmetric Key; a known value or random number, and a hash or other suitable check value computed over the Plaintext Header and the Security Context Body content. Including the hash value in the Security Context Body ensures that the Security Context content cannot be modified without detection.

To eliminate any possibility of forgery or unauthorized alteration, the Security Context hash may be digitally signed by the Logon Component 334. The authentication certificate of the Logon Component may be made available to all system components.

The Security Context Body is then encrypted using the Logon Component-specified symmetric or the generated private key referenced by the respective Key Handle. The Security Context and the symmetric session encryption key contained therein are then forwarded to the User and retained for the period for which the Security Context is valid. In some instances, the Time-Offset and Expiration Time values may also be returned to the User, which allows the User to renew the Security Context prior to its expiration.

At this point, Security Context building, encryption, and placement are completed and communication between the User and the Logon Component are terminated. Transaction-level communication between the User, Client Application, and TCE are re-established.

Figure 5:
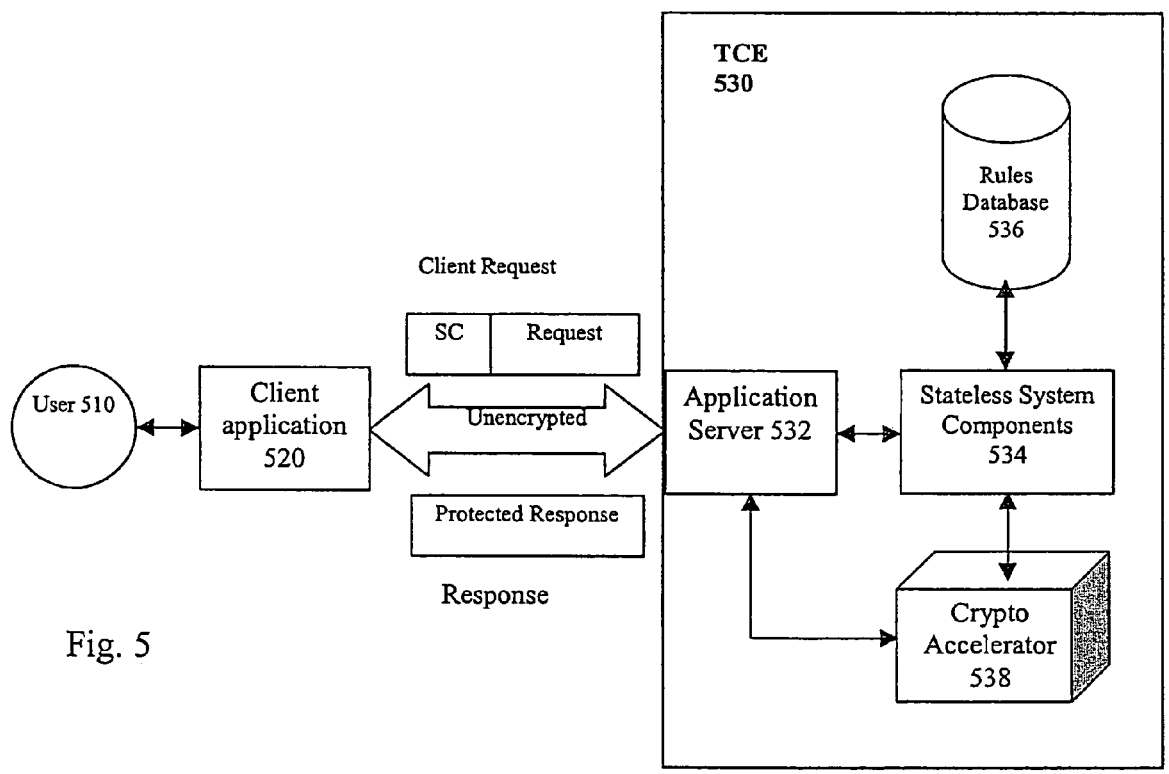
FIG. 5 is a block diagram of a user interacting with a secured client application in a system in accordance with this invention.

Referring to FIG. 5, there is illustrated an embodiment of this invention in which a User 510 seeks access to protected applications (program objects) and records available from the TCE 530 via a Client Application 520 and Cryptographic Token. As can be seen from FIG. 5, the TCE 530 includes Stateless System Components 535 that are Application Server-side program objects that are instantiated to satisfy user requests for processing or information. The term "stateless" indicates that no request history is retained and the authentication methods of the system are independent of the particular state, or application/transaction/routine, being invoked.

The Stateless Components 535 may be considered as existing at an "industry level" or at a "core level". Core-level components are reusable program objects that are industry-independent and thus will be understood as those components that are typically at the heart of any processing system. Thus, core-level components are used by all users of the TCE. The strongest security enforcement is found at the core level where access restrictions can be enforced broadly. Industry-level components are also reusable program objects but are industry-dependent. Thus, industry-level components are used by only a subset of all users of the TCE, i.e., the subset of users that can be categorized as the respective "industry". It will be appreciated that this description of different levels is merely for organizational convenience and that one or more levels may be employed.

It will be understood that the operation of the TCE 530 is effectively transparent to the User 510, who simply logs onto the system and operates as the User would in an otherwise conventional distributed processing system. An important difference is that a permanent session does not have to be established between each User 510 and Application Server-side components in the TCE 530. Application Server-side components can therefore be stateless since all the information needed to authenticate a User's request is communicated in the Security Context that is included in the User's request. After a Stateless System Component 535 finishes a task, it is free to service another User's request.

Referring again to FIG. 4c and also to FIG. 3, the User ID represents the User's logon ID, and the Organization ID represents the organization to which the User belongs. As discussed above, the Organization ID field can be expanded to include Sub-Organization ID's which represent subsidiary or departmental divisions under a primary organization. One advantage of this is that a single User, who may be affiliated with multiple organizations, subsidiaries, and/or departments, can have different levels of access authorized as a function of the particular organization or group that the User is representing at the time of logon. Similarly, the Roles, Credentials, and Other Authorization Information field comprise additional levels by which access can be controlled, depending on who the User is and what role or responsibility the User is fulfilling at the time of logon. These elements and rules permit customized access to protected system resources, depending, for example, on whether a User is acting as an owner, manager, agent, etc. These authorizations or access permissions are preferably established with sufficient granularity to achieve system and application security policy objectives.

A Time-Offset field is used by the Logon Component 334 and Stateless System Components 535 to adjust for discrepancies between TCE system (current) time and Client Time, which is the time at the User's computer or browser (see FIG. 6b). This facilitates operation of the Security Context and TCE in environments where time synchronization among User and system components is not available. This feature can compensate when a component's internal clock is otherwise stable and within normal tolerances.

An Expiration Time field identifies the time of expiration of the Security Context, placing an upper limit on the life of the Security Context. This is enforced by the Stateless System Components 535 and can be used by Users to renew their Security Contexts. An Expiration Time is also associated with every Security Context encryption key. Exceeding the Expiration-Time value forces the Logon Component 334 to create a new Security Context encryption key. In this way, the number of Security Contexts that are protected by a given key and uses thereof can be limited. The Security Context encryption keys are deleted on the Application Server-side after the Expiration-Time value is exceeded, and thus subsequent attempts to access transactions or records using Security Contexts with outdated encryption keys fail. Either symmetric or asymmetric encryption may be employed.

The Logon Component 334 may also establish a maximum count for the number of times a particular Security Context encryption key is used. When the count in a Request Counter field (see FIG. 6b) exceeds this pre-established threshold, the Logon Component 334 may be asked to create a new Security Context.

The User Public Key Algorithm field may contain an algorithm ID, key, and/or Authentication Certificate. The public key pair may be generated by the Logon Component 334 or the Client Application, or created in conjunction with the issuance of a user's X.509 authentication certificate and public-key pair delivered in a Cryptographic Token. The private key is held at the User's location, possibly in a hardware Token. The public key is passed to the Logon Component 334 during symmetric session key negotiations or is passed in the user's X.509 certificate. To reduce processing overhead, the public key information may be extracted from the X.509 certificate and placed directly in the Security Context.

Referring again to FIG. 5, with a Security Context having been established for each User 510 logging onto the system 530 with a particular logon ID, organization ID, password, and optionally, role identifier, the authority of each User 510 as verified through the Stateless System Components 535 can be determined without having to preserve any user-specific state information and without having to access a rules or authorization file. In other words, the Stateless System Components 535 need not maintain knowledge regarding any particular active User 510 or invoked Stateless System Component 535. All such knowledge is passed in the encrypted Security Contexts. In this way, a plurality of stateless system components can be instantiated simultaneously and/or on an as-needed basis and transaction and information routing restrictions can be removed, since each Security Context/User Request is treated independently. Therefore, a plurality of secure digital components may be simultaneously accessed merely by forwarding an authenticated user's Security Context to the validation portion of each Stateless System Component.

All Stateless System Components 535 that may be asked to perform some action or to access desired information in response to a User request must be given access to the User's Security Context to determine whether the requested action or access is authorized. Since the Security Context is encrypted, the Stateless System Components 535 are provided with the right to use the cryptographic key identified in the Plaintext Header to read the contents of a particular Security Context, including the Authorization Information, in conjunction with the set of cryptographic services performed by the Cryptographic Accelerator 538. In addition to implementing controls to limit User access to protected Components, this invention may also be applied to automatically authenticate action and access requests between Stateless System Components 535.

Following successful creation of a Security Context for a given user logon session, the Security Context can be effectively applied in several ways to control securely and efficiently user access to protected program objects and records. As illustrated by FIGS. 5 and 6a, a User appends its User Request or Submission to the encrypted Security Context it has received in order to provide a secure access instruction/authorization to the Application Server 532 and Stateless System Components 535 to fulfill the User's Request. Referring to FIG. 6a, a User Request, which may be directed to an action request, transaction access request, or record access request, among other things, is appended to the encrypted Security Context and forwarded through the Application Server 532 to the appropriate Stateless System Component 535. Alternatively, the User Request may be a data submission to modify or replace an existing protected record.

It will be appreciated that the User Request or Submission depicted in FIGS. 5, 6a, and 6b, and for that matter substantially any of the communications described or necessitated by this description, can be enclosed in a "wrapper", which is a kind of envelope that is used to securely hold and associate digitized handwritten and cryptographic digital signatures with part or all of one or more electronic information objects or data contained in the wrapper. Wrappers may take the form of any open standard enveloping or information object (document) formatting schemas, and generally a wrapper is a data structure containing tags that permit locating and extracting information fields contained in the wrapper. Two examples are RSA Laboratories' PKCS #7 and the World Wide Web Consortium (W3C) Extensible Markup Language (XML) Signature Syntax and Processing Draft Recommendation, although any record format supporting inclusion of digital signatures with content may be used, including, but not limited to, S/MIME, XFDL, HTML, and XHTML, which provide support for signature syntax, processing and positioning (tags). The PKCS #7 standard supports zero, one, and multiple parallel and serial digital signatures (cosign and countersign) and authenticated and unauthenticated attributes that are associated with the signatures. Information elements that may be contained in wrappers include algorithm identifiers, key size for each algorithm, content, and signatures, and wrappers can be applied recursively, which simply means that wrappers can be contained within wrappers.

Upon receipt of a Security Context/User Request, a Stateless System Component 535 directs the decryption of the Security Context. The Stateless System Component 535 first uses the Plaintext Header Key Handle and Algorithm Identifier information to identify the corresponding cached decryption key to the Cryptographic Accelerator 538. A number of active symmetric and asymmetric encryption and decryption keys are held in protected storage by the Cryptographic Accelerator 538, and each is referenced by a unique handle contained in a Security Context header as described above. The Stateless System Component 535 then enables the Cryptographic Accelerator 538 to decrypt the Security Context Body and User Request, which make the User's identification and access authorization information and the request contents available to the Component.

The Stateless System Component 535 verifies the integrity of the received Security Context and User Request by verifying the respective hashes and/or the digital signature, if used. The Stateless System Component 535 compares the roles, credentials, and authorization information from the decrypted Security Context Body with the User Request. If there is a mismatch between the authorization information and the Request, the access attempt fails and the User 510 is so notified, and control is passed back to the User 510 either to submit another Request or to terminate the session. Similarly, if the time of submission is outside the Expiration-Time window for the Security Context, then the access attempt fails. If insufficient information exists in the Security Context authorization information field, the Stateless System Component 535 may access the Rules Database 536 for additional information. If insufficient information still exists after accessing the Rules Database 536, the access request fails, and the User 510 is so notified. If the access verification process has been successful, then the Stateless System Components 535 are permitted to proceed with fulfilling the user request, with a response ultimately being directed back to the User 510.

As illustrated by FIG. 6b, Client Time and Request Counter fields may be included in the Security Context/User Request data stream. The Client Time represents the time at the User's computer, terminal, or other system access device. The User may be given the option of comparing Client Time, as adjusted by a Time-Offset value, to the Expiration-Time limit. If the adjusted Client Time exceeds the Expiration Time, the User then knows that any authorization and access requests will fail, and the User can efficiently logoff and log back on or otherwise initiate a new session, thereby creating a new Security Context with a new Expiration Time. If the User (Client Application) is not enabled to perform this check, rejection of any and all requests, termination of the session, or a direct alert will force the User to create a new Security Context.

The Request Counter field is typically initialized at zero at the creation of the Security Context and is incremented each time a User Request with this particular Security Context is directed to the Stateless System Components 535. In this way, use of the Security Context can be limited, with the User being denied access should the Request Counter exceed a predetermined maximum. It will be appreciated that decrementing Request Counters can also be used. Additionally, the Request Counter may be used to match Requests with System Component responses when responses are returned asynchronously (out of chronological order). Thus, a request counter is included in the request for access, and if access is granted, a response is sent to the user that includes the request counter, which the user uses to match the response, which may be an acknowledgement of an action performed (e.g., creation of a "certified" printout of a record), to the request. Finally, the Request Counter can prevent "replay" attacks, in which a hacker intercepts a User Request or Component Response and falsely presents the Request for access to a protected transaction or record or replays the Response to create network and system congestion. The system 530 and client application 520 both recognize when the Request Counter in the Security Context/User Request data stream is out of synchronization with previous Requests and reject the false Request. Alternatively, Client Time (FIG. 6b) can also be used to prevent replay attacks.

In another embodiment, the User Request portion of the secured Security Context/User Request stream depicted in FIGS. 6a, 6b may be encrypted prior to being passed to the Stateless System Components 535, utilizing the symmetric key or the public key held by the User and disclosed in the Security Context. Encryption of all or part of the User Request additionally protects against an outsider threat or disclosure of sensitive information. Since the encryption key is internally selected within the Logon Component 334 and passed internally to the User within the Security Context or within a secure session with a login component, and because each encryption key has a limited life by application of the Expiration-Time feature, outsider access to a User Request for unauthorized use is substantially impossible. Upon receipt of the User Request, the cached decryption key is identified by the Stateless System Component 535 and used to decrypt the Request.

In another embodiment, all or part of a User Request may be hashed prior to being forwarded to the Stateless System Component 535, with the hash value being appended to the User Request. The Stateless System Component 535 would then hash the received User Request and compare its result with the hash value appended to the User Request. If the two hash values match, the system can be reasonably assured that the User Request has not been modified. If the two hash values do not match, the User-side application can be instructed to re-send the Security Context/User Request/Hash data stream, or a message can be sent to the User advising that receipt of a corrupt Request resulted in failure prior to the request authorization process.

In yet another embodiment, a digital signature can be applied to all or part of the Security Context/User Request data, with the digital signature being verified upon receipt by the Stateless System Components 535. Upon verification or non-verification, the Stateless System Components 535 proceed as described above in connection with Request validation. Both the hashing and digital signature features help prevent middleman and substitution attacks on the access authorization process.

In yet another embodiment of the invention, encryption and hashing of the User Request are combined to provide a secure, non-forgeable session for the authorized access of transactions and records.

FIG. 7 depicts a response to a User 510 by protected Stateless System Components 535. The response may be transmitted to the User in plaintext, relying on the integrity of the session encryption, or the response may be encrypted using the secret encryption key embedded within the Security Context and held by the User. As discussed above, the User advantageously utilizes the Request Counter field to match the response received from the system 530 with its User Request. This is particularly important when responses are returned asynchronously (out of order), such as when the Components 535 process multiple requests and when the User submits multiple access requests across a plurality of Application Servers 532.

It should be understood that a User does not have access either to the Security Context encryption key or to the contents of the Security Context. Only the Logon Component and Stateless System Components have such access. Use of a digital signature by the Logon Component prevents modification by any component, enabling the Security Context's content to be trusted. The User Request encryption key, Time Offset, and other relevant information needed by the User are passed to the User/Client Application during the secure Security Context setup session. It will be appreciated that both trusted and untrusted Stateless System Components can be used by layering the methods described here, increasing bit overhead as needed to achieve an appropriate level of protection.

Figure 8:
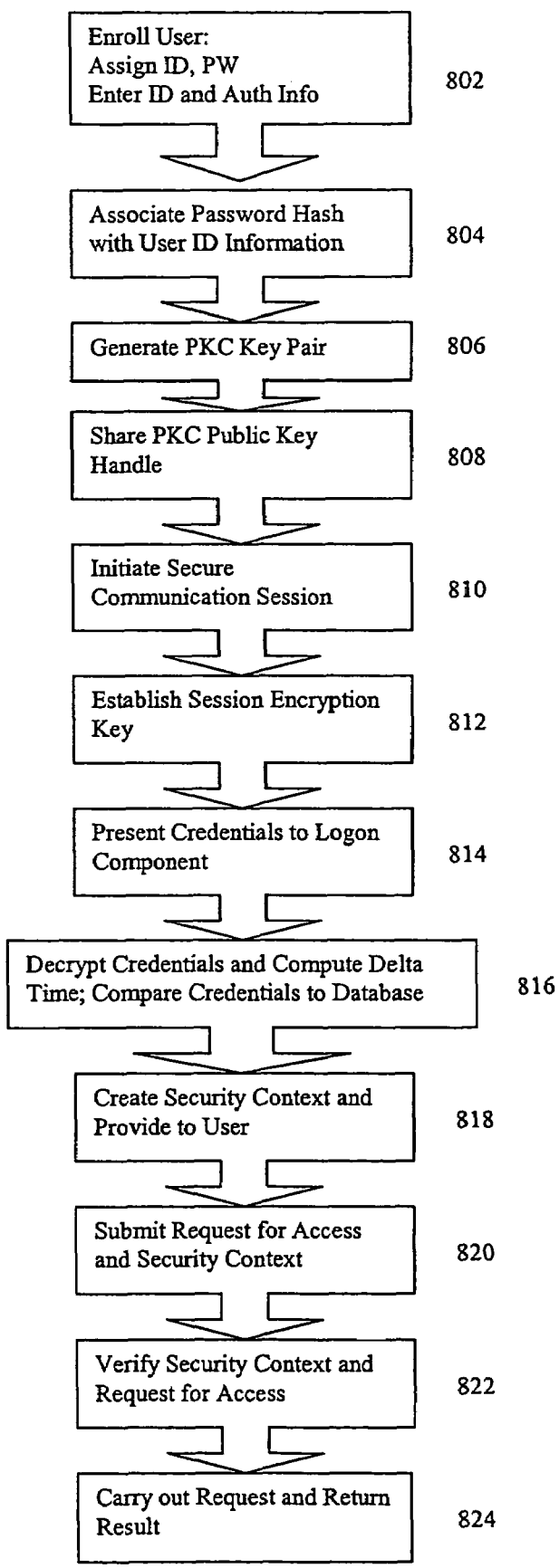
FIG. 8 illustrates methods in accordance with the invention.

Application of the methods described above is illustrated by FIG. 8, although it will be understood that not all of the features described above are included.

In block 802, a system administrator is instructed by an authorized source to enroll a user, whose identification and authorization information is entered into a system enrollment database. The user is assigned a user ID and preferably an organization ID that uniquely identifies the user to the system, although it will be understood that other means of uniquely identifying users may be employed.

Block 804 indicates that three password methods may be supported: initialize (requiring the system administrator's password); check (requiring the logon component's password); and change (requiring a user's current password). During enrollment, a default password may be created and assigned to the user. The hash of the default password is associated with the user's unique identity and saved in protected storage. The plaintext password is made available to the system administrator, who arranges for its delivery to the user, preferably using an out-of-band means, such as an approved courier. The logon component facilitates the user's changing its default password to one that is more memorable. A new password can be issued if the user forgets its password or believes its password may have been compromised or from time to time.

In block 806, a private key is used by the system's logon component to protect security contexts. A new PKC pair is generated at suitable intervals, which may vary by application or industry. The most recently generated key pair can be called the current key pair, and key pairs may conveniently be generated by any suitable hardware cryptographic accelerator. The handles of the private key and public key of the current key pair are made available to the logon component. The private key is accessible only to the logon component. Prior (non-current) key pairs persist until their respective expiration times are reached. This overlap is chosen to be sufficiently long as to minimize the need for Users to have to request new Security Contexts. The logon component uses only the current key pair.

In block 808, the public key handle is shared with trusted stateless system components that, as trusted components, must be implemented in a protected operating environment. Access to a trusted system component is granted by the logon component's sharing the current public key handle and the address of the cryptographic accelerator with the component. Access by any other component is blocked, for example by a software or hardware firewall. Any such components require a Security Context to access system resources.

In block 810, the first occurrence of a user's needing access to system resources (components) requires the user, through its client application, to initiate a communications session with the logon component. An SSL session is preferably invoked.

In block 812, if an SSL encrypted session is not used, the user's client application engages in an exchange with the logon component that results in a symmetric-session encryption key existing at both the client application and the logon component. This symmetric-session encryption key is the basis of subsequent secure communications between the user and the system and authentication with all trusted stateless system components. The symmetric-session encryption key may be used to encrypt user service requests.

In block 814, the user presents its credentials to the logon component, which asks the user to enter its unique identifying information and password. At this point, the user may be given an opportunity to change its password, either its default password generated at enrollment or its current password. System security policy typically dictates how often a user must change its password.

In the following description, the logon information is encrypted using a session-symmetric key, although as noted above an SSL session could be used. The user's client application forwards the user-entered information to the logon component using a predefined self parsing data structure such as the following, in which { } indicate an encrypted value, subscript identifies a key, and [ ] indicate plaintext:

---
User ID,
Organization ID,
{Password,
    Client Time}$_{symmetric\text{-}session}$
---

To change a user's password, the client application forwards the user-entered information using a data structure such as the following:

---
User ID,
Organization ID,
{Password,
    New Password, New Password Confirmation,
    Client Time}$_{symmetric\text{-}session}$
---

In block 816, the logon component decrypts the Password (s) and Client Time using the symmetric-session key and computes a Delta Time value, which is the difference between the Client Time and the system time of the core server. The user's Password is then hashed according to an algorithm such as SHA-1 and compared to a hash value stored in the system database. If the hashes match, the user's Password is validated, and if a change of Password is requested, the logon component initiates the Password change procedure. If Password validation fails, the user may be given one or more chances to submit a correct Password, as specified by system security policy, before being locked out of the system.

In block 818, after successful user/client logon, the logon component builds and returns to the user/client a Security Context (SC) that preferably includes the following elements:

---
SC = [ SC ID,                                         Plain Text SC Header
    AlgorithmID$_{public\text{-}current}$,
    KeySize$_{public\text{-}current}$,
    Handle$_{public\text{-}current}$]+
{ User ID,                                         Encrypted SC body
  Org ID,
  Authorizations,
  Bypass Flag(s)
  Expiration Time,
  Delta Time,
  AlgorithmID$_{symmetric\text{-}session}$,
  KeySize$_{symmetric\text{-}session}$,
  Key$_{symmetric\text{-}session}$,
  Hash}$_{Private\text{-}current}$
---

In block 820, the user/client application may submit requests to trusted stateless system components using the SC returned to the user/client by the logon component. The client does so by appending a request to the SC. Two examples of SC-request combinations follow:

[SC Header, {SC body}$_{Private\text{-}current}$][{Client time}$_{symmetric\text{-}session}$, Request]

[SC Header, {SC body}$_{Private\text{-}current}$][{Client time, Request, Hash}$_{symmetric\text{-}session}$]

In block 822, the SC and request are verified by any trusted stateless system component by using the stored key referenced by Handle$_{Public\text{-}current}$ to decrypt the SC body, then extracting and using the symmetric-session key to decrypt the encrypted portion of the Request, validating the Request by at least checking that system time=Client Time±Delta Time, and further verifying the request by validating a hash and/or client digital signature if used.

In block 824, if the SC and Request are successfully validated, then the stateless system component uses the content of the SC and Request to perform the requested actions. In this way, the stateless system component may act as a trusted proxy for the user/client. The result of the request, if fulfilled, is returned to the user/client application. If desired, the result may be encrypted using the symmetric-session key.

It will be understood that these methods and systems are effectively transparent to a user, who simply logs on to the system and operates as the user would in a conventional distributed system. An important difference is that a permanent session does not have to be established between the user/client application and server-side components, which can be stateless since all the information needed to authenticate a user's request is communicated in an non-forgeable security context. After a stateless system component finishes its task, it is free to service another user request. Additional request capacity may be obtained by simply adding application servers and/or instantiating stateless system components (program objects). These additions will also be totally transparent to client applications.

Although preferred embodiments of the present invention have been shown and described, it will be appreciated by those skilled in the art that changes may be made in these embodiments without departing from the principle and spirit of the invention, the scope of which is defined in the appended claims and their equivalents.

What is claimed is:

1. A method of enabling access to a resource of a distributed application server or processing system by a user/client application possessing a valid security-context, comprising the steps of:

receiving the security-context and an appended protected security-context renewal request provided by the user to an access authorization component of the application server or processing system;

verifying the validity of the security-context and the security-context renewal request;

extracting content of both the security-context and the security-context renewal request;

comparing current time to an expiration time identifying time of expiration of the security-context;

if the expiration time is less than the current time, comparing the security-context renewal request with stored identity and authorization information comprising at least one of a user identifier, an organization identifier, a sub-organization identifier, a key, an authentication certificate, an user location, a user role, and an user position identifying the user to the access authorization component and generating a new symmetric key, and other access and authorization information;

generating an updated security-context based on the verifying of the user's identity and authorization and based on the user having requested authority for access to the resource and services;

providing the updated security context to the user; and sending the updated security-context and a request for access to the resource and services by the user to the application server or processing system.

2. The method of claim 1, wherein a resource identified in the security-context renewal request is at least one of a processor, a program object, and a record of the distributed application server or processing system, and wherein components of the distributed application server or processing system are accessible by an user presenting a valid security-context that contains the required information for authentication.

3. The method of claim 1, wherein the access authorization component provides a symmetric encryption key to the user in a security-context that is used to protect each asynchronous request and resulting response exchanged between the user and the distributed application server or processing system.

4. The method of claim 1, wherein the protected security-context eliminates the need to establish a secure communication session between a user desiring access and the computing resource servicing the request by providing information used in authenticating and processing the security-context and the request, and wherein the request is to renew or change the security-context made to the access authorization component or to access services or resources made to a stateless system component of the distributed processing system.

5. The method of claim 4, wherein the stateless resource receiving the request for access or service verifies the user's identity information and authorization information included in the accompanying security-context, verification including checking for agreement with the stored authorization information.

6. The method of claim 5, further comprising the step of:
determining, by a stateless component of the processing system, based on the security-context sent with the request for access by the user, whether access to the requested resource and services should be granted to the user and fulfilling the request if authorized.

7. The method of claim 6, wherein the request for access is at least partially encrypted with the symmetric key extracted from the security-context, whereby the receiving resource is allowed to access this same symmetric key to decrypt the request and later to at least partially encrypt the response when required.

8. The method of claim 6, wherein a hash value is computed over the request for access, the hash value being included with the security-context and the request for access sent by the user to the distributed application server or processing system, and wherein integrity of the request for access is verified based on the hash value and access is granted only if the integrity of the hash value is verified.

9. The method of claim 8, wherein the user digitally signs the request for access, the user's public key is being included with the security-context and the request for access sent by the user to the distributed application server or processing system, and wherein the user's digital signature is verified by the application server or processing system using the user's public-key extracted from the security-context, access to the resource being granted only if the user's digital signature is authenticated.

10. The method of claim 9, wherein the security-context and request for access and services are included in a wrapper in which together with the digitally signed request enables detection of any unauthorized modification.

11. The method of claim 6, further comprising the step of:
after access to the requested resource or service is granted, sending a response to the user that includes a request counter that enables the user to match the responses to the request for access due to more than one distributed resource being able to fulfill the request.

12. The method of claim 1, wherein at least one of a client time and a request counter is sent by the user to the distributed application server or processing system with the security-context and the request for access to the resource to enable the server or system to discard any unauthorized replay of requests that would reduce resource availability.

13. The method of claim 12, wherein the request counter is sent by the user and access to the resource is denied if the request counter differs from a predetermined value set by a security policy that limits overuse of the security-context.

* * * * *

UNITED STATES PATENT AND TRADEMARK OFFICE
CERTIFICATE OF CORRECTION

PATENT NO. : 7,657,531 B2 Page 1 of 1
APPLICATION NO. : 11/325463
DATED : February 2, 2010
INVENTOR(S) : Bisbee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 303 days.

Signed and Sealed this

Thirtieth Day of November, 2010

David J. Kappos
*Director of the United States Patent and Trademark Office*